United States Patent [19]

Kawai et al.

[11] 4,421,091

[45] Dec. 20, 1983

[54] IGNITION SYSTEM FOR INTERNAL COMBUSTION ENGINES

[75] Inventors: Hisasi Kawai, Toyohashi; Hiroshi Sada, Okazaki; Toshihiko Igashira, Toyokawa; Toru Yoshinaga, Okazaki, all of Japan

[73] Assignee: Nippon Soken, Inc., Nishio, Japan

[21] Appl. No.: 361,614

[22] Filed: Mar. 25, 1982

[30] Foreign Application Priority Data

Mar. 31, 1981 [JP] Japan .................................. 56-49160

[51] Int. Cl.$^3$ .............................................. F02P 1/00
[52] U.S. Cl. .................................... 123/620; 123/625; 123/645
[58] Field of Search .............. 123/620, 625, 609, 610, 123/618, 629, 630, 645, 651, 652

[56] References Cited

U.S. PATENT DOCUMENTS 3,896,776  7/1975  Ford ..................................... 123/651
4,100,908  7/1978  Leussink ............................. 123/645
4,176,644  12/1979  Hellberg .............................. 123/625

FOREIGN PATENT DOCUMENTS 2406018  2/1974  Fed. Rep. of Germany ...... 123/645
1334230  1/1970  United Kingdom ................ 123/625

Primary Examiner—Ronald B. Cox
Attorney, Agent, or Firm—Cushman, Darby & Cushman

[57]  ABSTRACT

In an ignition system for an internal combustion engine in which the flow of a primary winding energizing current is switched on and off in synchronism with the rotation of the engine and a high voltage is induced in the secondary winding upon switching off of the energizing current, an energizing current is supplied again at around the top dead center of each cylinder and then decreased gradually and interrupted in accordance with a sawtooth waveform whose voltage attains a predetermined potential at around the top dead center and then decreases gradually.

4 Claims, 2 Drawing Figures

IGNITION SYSTEM FOR INTERNAL COMBUSTION ENGINES

BACKGROUND OF THE INVENTION

The present invention relates to ignition systems for internal combustion engines and more particularly to a control system for controlling the duration time of ignition sparks.

During low speed and low load operation of a spark-ignition engine, the ignition of the air-fuel mixture is difficult due to a large quantity of the residual burned gases. Moreover, the recent trend toward using exhaust emission controls and lean air-fuel mixtures has made it increasingly important to improve the ignition performance during the periods of low speed and low load operation.

It has been discovered that if the duration time of sparks is increased to about 3 msec, for example, as a means for overcoming the foregoing difficulty, the ignition capacity can be increased greatly under such operating conditions.

However, this increased duration time of sparks is disadvantageous in that not only the duration time is wasted during the periods of high speed or high load operation where the ignition performance is good, but also the rate of wear of the spark electrodes is increased considerably. Thus, apparently it has been impossible to accomplish both the increased ignition capacity and the avoidance of the wear of the plug electrodes at a time.

However, the present inventors have discovered that the wear of the electrodes of spark plugs is mostly attributable to the discharge after the piston has passed the top dead center on the compression stroke and that the discharge occuring before the top dead center on the compression stroke practically contributes nothing to the wear of the electrodes.

This is considered to be due to the fact that the occurrence of discharge in the presence of a high pressure, high temperature and flame promotes the rate of wear of the spark plug electrodes.

Also, the studies made by the inventors have shown that the discharge occurring after the top dead center on the compression stroke makes practically no contribution to the ignition. As a result, there has existed a need for an ignition system so designed that the spark is not allowed to continue beyond the top dead center on the compression stroke and that the spark is maintained as far as possible for the periods of low speed and low load operation.

To meet these requirements, as disclosed in the specification of U.S. Pat. No. 3,896,776, a system has been proposed in which when the top dead center (TDC) position is reached, the primary winding is energized to cut off the secondary discharge. In this system, a first voltage pulse train and a second voltage pulse train are produced so that in response to the positive-going transition of the first voltage pulse train, the second voltage pulse train including a much greater number of pulses than the first voltage pulse train is computed to determine the starting point of ignition and in response to the negative-going transition of the first voltage pulse train the primary winding of the ignition coil is energized to cut off the secondary discharge. Thus, the primary winding is held "OFF" during the time interval between the production of a spark at the ignition starting point and the termination of the spark at the TDC and the primary winding is held "ON" throughout the other periods. In accordance with this characteristic diagram the calculation of the ON and OFF periods of the primary winding shows that the corresponding ON and OFF periods for every ½ engine revolution are respectively 4.3 ms and 0.7 ms with the OFF/ON ratio of 16% at the engine speed of 6000 rpm, 8.9 ms and 1.1 ms with the ratio of 12% at 3000 rpm and 48.3 ms and 1.7 ms with the ratio of 3.5% at 600 rpm. As a result, there is a disadvantage that if the ignition control is performed according to this control system throughout the speeds of an engine, the ignition coil generates heat and eventually it is burned out. In order to avoid the disadvantage, it is considered to deenergize the primary winding at the expiration of a predetermined time after the primary winding has been energized to cut off the secondary discharge. But it causes another disadvantage of producing a harmful high voltage in the secondary winding upon the deenergization of the primary winding. Relating to an ignition system for solving such problems, a U.S. Pat. copending application Ser. No. 264,693 has been filed on May 18, 1981 and assigned to the assignee of the present application.

SUMMARY OF THE INVENTION

With a view to overcoming the foregoing dificiencies, it is the primary object of this invention to provide an improved ignition system in which in order to deenergize the primary winding after the deenergization thereof, the current flow in the primary winding is not cut off in a moment but decreased gradually starting at around the top dead center of each cylinder in accordance with a sawtooth voltage which attains a predetermined potential at around the top dead center and then decreases gradually thereby overcoming the foregoing deficiencies without inducing any high voltage in the secondary winding.

DESCRIPTION OF THE PREFERRED EMBODIMENT

The present invention will now be described in greater detail with reference to the illustrated embodiment.

Figure 1:
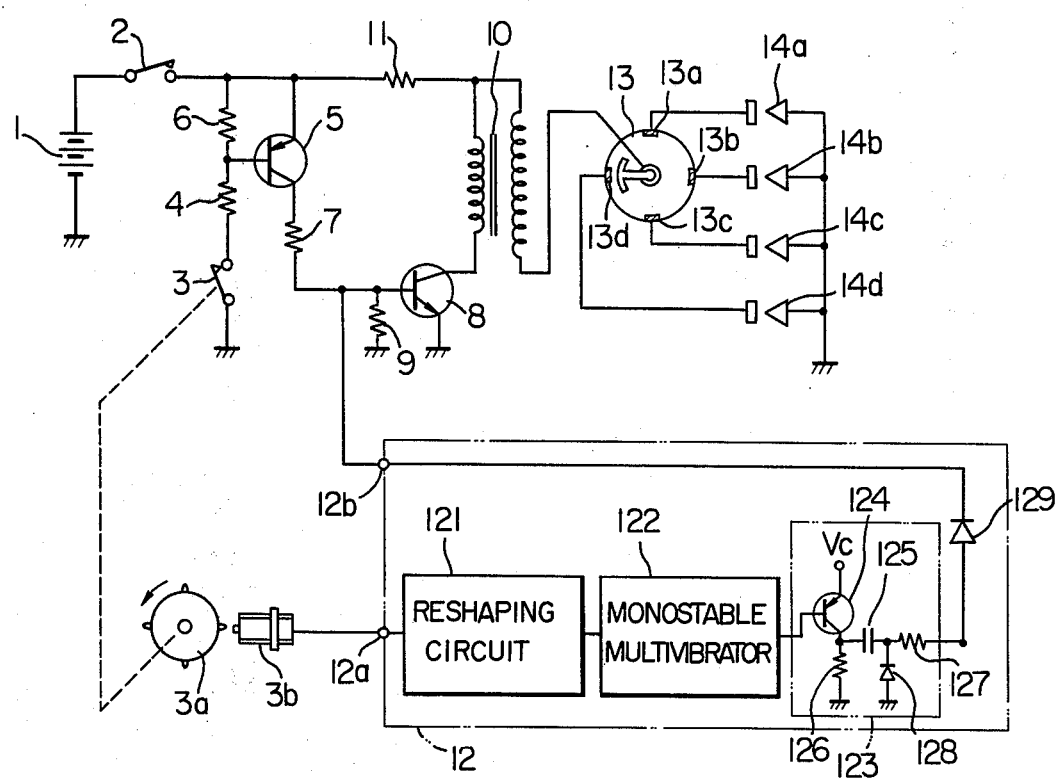
FIG. 1 is a circuit diagram showing an embodiment of an ignition system according to the invention.

Referring to FIG. 1, numeral 1 designates a battery having its negative terminal grounded. Numeral 2 designates a key switch having its one end connected to the positive terminal of the battery 1. Numeral 3 designates a breaker contact incorporated in a distributer unit to serve as an ignition signal generator, and the breaker contact 3 has its one end grounded and its other end connected to one end of a resistor 4. The other end of the resistor 4 is connected to the base of a PNP transistor 5. The emitter of the transistor 5 is connected to the other end of the key switch 2. A resistor 6 is connected across the emitter and base of the transistor 5. The collector of the transistor 5 is connected to one end of a resistor 7 whose other end is connected to the base of an NPN power transistor 8. The emitter of the power transistor 8 is grounded. A resistor 9 is connected across the base and emitter of the power transistor 8. The collector of the power transistor 8 is connected to one end of the primary winding of an ignition coil 10. The other end of the primary winding of the ignition coil 10 and one end of its secondary winding have a common connection to one end of a resistor 11. The other end of the resistor 11 is connected to the other end of the key switch 2. The secondary winding of the ignition coil 10 is connected to spark plugs 14a to 14d via side electrodes 13a to 13d of a high voltage distributor 13 of the distributor unit.

Numeral 3a designates a rotor of magnetic material which is incorporated in the distributor unit. The present embodiment is applied to a four-cylinder internal combustion engine and consequently the rotor 3a includes four equally spaced projections each positioned near the top dead center (TDC) of the associated cylinder. The projections are detected by a sensor 3b. The sensor 3b comprises a known type of magnet pickup. The output of the sensor 3b is connected to an input terminal 12a of a control circuit 12. The input terminal 12a of the control circuit 12 is connected to a waveform reshaping circuit 121 so that the signal from the sensor 3b is reshaped to a rectangular waveform.

The output of the reshaping circuit 121 is connected to a monostable multivibrator 122. The output of the monostable multivibrator 122 is connected to the base of a PNP transistor 124. A predetermined voltage $V_c$ is applied to the emitter of the transistor 124 and its collector is connected to one end of a resistor 126 and one end of a capacitor 125. The other end of the resistor 126 is grounded. The other end of the capacitor 125 is connected to one end of a resistor 127 and the negative terminal of a diode 128. The other end of the resistor 127 is connected to the positive terminal of a diode 129. The positive terminal of the diode 128 is grounded. The negative terminal of the diode 129 is connected to an output terminal 12b of the control circuit 12 and the output terminal 12b is connected to the base of the power transistor 8. The transistor 124, the resistors 126 and 127, the capacitor 125 and the diode 128 form a sawtooth generating circuit 123.

Figure 2:
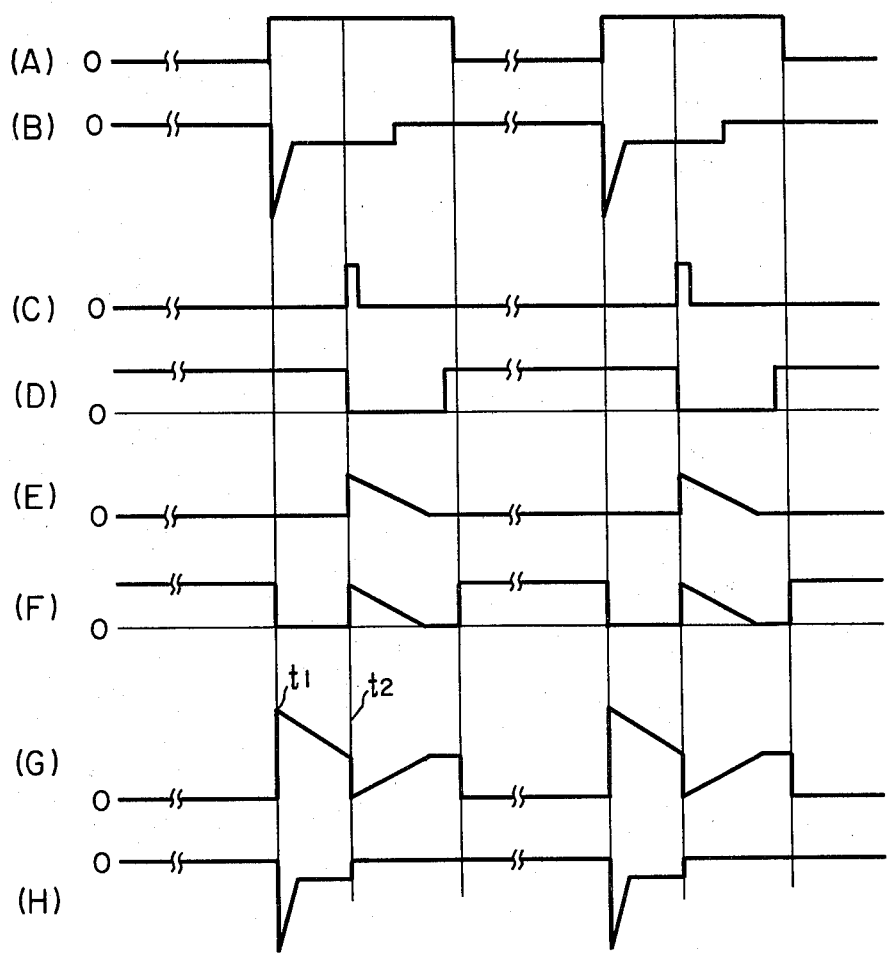
FIG. 2 shows a plurality of waveforms at various points of FIG. 1 which are useful for explaining the operation of the system shown in FIG. 1.

With the construction described above, the operation of the embodiment will be described briefly. When the key switch 2 is closed so that the engine is operated, the breaker contact 3 is opened and closed due to the rotation of the engine. As a result, when the breaker contact 3 is closed, the transistor 5 is turned on so that a current flows through the resistor 7 and the base and emitter of the power transistor 8. Consequently, the power transistor 8 is turned on and the current flows to the primary winding of the ignition coil 10 forming the load. Then, as the breaker contact 3 is opened so that the transistor 5 is turned off, the power transistor 8 is turned off and the primary current in the ignition coil 10 is cut off. At that moment, a high voltage is produced in the secondary winding and a spark is developed at the proper spark plug. FIG. 2 shows the resulting waveforms. In FIG. 2, (A) shows the base voltage waveform of the transistor 5 and (B) shows the secondary high voltage waveform of the ignition coil 10 when the control circuit 12 is not in operation.

On the other hand, the sensor 3b detects the signal from the rotor 3a which rotates in synchronism with the breaker contact 3. The resulting output signal from the sensor 3b represents the TDC position. The control circuit 12 will now be described. The signal from the sensor 3b is reshaped by the waveform reshaping circuit 121 producing the waveform in (C) of FIG. 2. In response to the signal from the waveform reshaping circuit 121 the monostable multivibrator 122 generates a low level output of a predetermined pulse width as shwon in (D) of FIG. 2. When the output of the monostable multivibrator 122 goes to the low level, the PNP transistor 124 is turned on. At that very moment, the junction point of the resistor 126 and the capacitor 125 goes to a high level substantially equal to the fixed voltage $V_c$. Thus, a voltage is produced at the output terminal 12b of the control circuit 12 through the capacitor 125, the resistor 127 and the diode 129. When this occurs, a current flows to the base of the power transistor 8. However, the current decreases gradually with the time constant of the capacitor 125 and the resistor 127. Thus, as shown in (E) of FIG. 2, a sawtooth waveform is produced at the other end of the resistor 127 or the output of the sawtooth generating circuit 123. When the output of the monostable multivibrator 122 goes to the high level, the transistor 124 is turned off so that the charge stored in the capacitor 125 is discharged through the resistor 126 and the diode 128. The diode 129 is provided to prevent the transistor 5 from affecting the capacitor 125.

As a result, the base voltage of the power transistor 8 has the waveform in (F) of FIG. 2 due to the current from the transistor 5 and the current from the control circuit 12 and the collector voltage of the power transistor 8 has the waveform shown in (G) of FIG. 2. Consequently, the voltage produced in the secondary winding of the ignition coil 10 has the waveform in (H) of FIG. 2 and the high voltage in the secondary winding is interrupted at the TDC position.

While, in accordance with this invention, the TDC signals are generated and detected, provided that signals indicative of any other crank angle position are available, the TDC signal retarding circuit which is not shown and utilizing the known type of electronic advance unit may be inserted to form a TDC signal generator such that the TDC signal retarding circuit is controlled in accordance with the speed and load of the engine so as to vary the position at which the TDC signals are generated.

From the foregoing description it will be seen that in accordance with the present invention there is provided an ignition system comprising an ignition coil having a primary winding and a secondary winding for generating a high voltage to produce a spark, an ignition signal generator for generating an ignition signal to determine the times of turning on and off the primary current flow in the ignition coil, a power transistor responsive to the ignition signal from the ignition signal generator to turn on and off the primary current flow in the ignition coil, a TDC signal generator for detecting substantially the top dead center of each cylinder in synchronism with the crankshaft of the engine to generate a TDC signal, and a control circuit for generating a sawtooth waveform which attains a predetermined potential upon application of the TDC signal and whose voltage is decreased gradually with the lapse of time, the output terminal of the control circuit being connected to the base of the power transistor, whereby in response to the sawtooth signal the power transistor is turned on again upon occurrence of the TDC signal and then it is turned off gradually. Thus, there is a great advantage that despite its comparative simple construction, the ignition system can interrupt the ignition spark at around the TDC without causing the generation of heat in the ignition coil and the production of a harmful high voltage and irrespective of the speed of the engine, thereby reducing the wear of the spark plugs. Another great advantage is that instead of always interrupting the ignition spark at around the TDC, the time of interruption may be varied in the vicinity of the TDC in accordance for example with the speed and load of the engine, thereby further reducing the wear of the spark plugs.

We claim:

1. An ignition system for an internal combustion engine comprising:
    ignition coil means having a primary and secondary winding;
    means for supplying a primary current to energize said primary winding whereby a high voltage for producing a spark is induced in said secondary winding when said primary current is interrupted;
    ignition signal generating means for generating a first ignition signal in synchronism with the rotation of said engine to determine the times of switching on and off said primary current;
    switching means with a control input terminal responsive to said first ignition signal from said ignition signal generating means for switching on and off said primary current;
    TDC signal generating means for detecting, substantially the top dead center of each of cylinders of said engine to generate a TDC signal; and
    a control circuit for generating a second ignition signal having a sawtooth waveform, said second ignition signal attaining a predetermined potential at the moment said TDC signal is applied and then decreasing gradually with the lapse of time, said control circuit having an output terminal connected to said control input terminal of said switching means;
    whereby said switching means turned off in response to said first ignition signal is turned on again upon occurrence of said TDC signal and then turned off gradually in accordance with said sawtooth signal.

2. An ignition system according to claim 1, wherein said control circuit comprises:
    a waveform reshaping circuit for reshaping the TDC signal from said TDC signal generating means;
    a monostable circuit for receiving an output of said waveform reshaping circuit to generate a pulse output having a predetermined time width;
    a sawtooth generating circuit for generating a sawtooth waveform which attains said predetermined potential at the moment said pulse output is generated from said monostable circuit and then decreases gradually with the lapse of time; and
    a reverse current blocking diode for applying said sawtooth waveform from said sawtooth generating circuit to the control input terminal of said switching means.

3. An ignition system according to claim 2, wherein said sawtooth generating circuit comprises:
    a potential source for providing said predetermined potential;
    a capacitor and a charging resistor;
    a first switching transistor connected to the output of said monostable circuit to connect said potential source to the control input terminal of said switching means through said capacitor and said charging resistor; and
    discharging means including a diode connected to said capacitor.

4. An ignition system according to claim 1, 2 or 3, wherein said switching means comprises a power transistor, and therein said ignition signal generating means includes a second switching transistor having an emitter-collector path for connecting a base of said power transistor to a power supply terminal and a base whose connection to said power supply terminal is subjected to on-off control in synchronism with the rotation of said engine.

* * * * *